United States Patent
Hopeman, IV et al.

(10) Patent No.: US 10,810,198 B2
(45) Date of Patent: Oct. 20, 2020

(54) GROUP DETERMINATION BASED ON MULTI-TABLE DICTIONARY CODES

(71) Applicant: Oracle International Corporation, Redwood Shores, CA (US)

(72) Inventors: Albert Hopeman, IV, Arlington, MA (US); Ekrem S. C. Soylemez, Lexington, MA (US); Martin Roth, Ashland, MA (US)

(73) Assignee: Oracle International Corporation, Redwood Shores, CA (US)

( * ) Notice: Subject to any disclaimer, the term of this patent is extended or adjusted under 35 U.S.C. 154(b) by 349 days.

(21) Appl. No.: 15/918,132

(22) Filed: Mar. 12, 2018

(65) Prior Publication Data
US 2019/0095486 A1  Mar. 28, 2019

Related U.S. Application Data

(60) Provisional application No. 62/563,258, filed on Sep. 26, 2017.

(51) Int. Cl.
| G06F 16/00 | (2019.01) |
| G06F 16/2453 | (2019.01) |
| G06F 16/28 | (2019.01) |
| G06F 16/22 | (2019.01) |
| G06F 16/2455 | (2019.01) |

(52) U.S. Cl.
CPC .... *G06F 16/24537* (2019.01); *G06F 16/2264* (2019.01); *G06F 16/2282* (2019.01); *G06F 16/2456* (2019.01); *G06F 16/24544* (2019.01); *G06F 16/283* (2019.01)

(58) Field of Classification Search
CPC .......... G06F 16/24537; G06F 16/2282; G06F 16/24544; G06F 16/2456; G06F 16/283; G06F 16/2264
See application file for complete search history.

(56) References Cited

U.S. PATENT DOCUMENTS

| 2013/0060780 A1* | 3/2013 | Lahiri | H03M 7/42 707/741 |
| 2014/0372411 A1* | 12/2014 | Attaluri | G06F 16/258 707/722 |
| 2017/0255675 A1* | 9/2017 | Chavan | G06F 7/24 |
| 2018/0089261 A1* | 3/2018 | Li | G06F 16/23 |

* cited by examiner

*Primary Examiner* — Jared M Bibbee
(74) *Attorney, Agent, or Firm* — Hickman Palermo Becker Bingham LLP

(57) ABSTRACT

Techniques related to group determination based on multi-table dictionary codes are disclosed. In some embodiments, one or more non-transitory storage media store a sequence of instructions which, when executed by one or more computing devices, cause performance of a method. The method comprises storing a fact table and a dimension table that share a domain dictionary. The fact table and the dimension table each have a column of encoded join keys that is decodable using the shared domain dictionary. A query may specify one or more row groups for the dimension table. To efficiently process the query, one or more group identifiers are assigned to the one or more row groups. Each row group corresponds to a different group identifier. This enables a code-to-group-identifier mapping to be generated. The code-to-group-identifier mapping correlates the encoded join keys to the one or more group identifiers.

20 Claims, 18 Drawing Sheets

FACT TABLE 100

| ID 102 | AMOUNT 104 |
|---|---|
| 2 | 100 |
| 3 | 110 |
| 7 | 120 |
| 8 | 130 |
| 1 | 140 |
| 4 | 150 |
| 5 | 160 |
| 6 | 170 |
| 8 | 160 |
| 7 | 150 |
| 2 | 140 |
| 5 | 130 |
| 6 | 120 |
| 2 | 110 |
| 3 | 100 |
| 7 | 150 |

DIMENSION TABLE 106

| ID 108 | CITY 110 | COUNTRY 112 | STATE 114 |
|---|---|---|---|
| 1 | Ottawa | Canada | ON |
| 2 | Seattle | United States | WA |
| 3 | Spokane | United States | WA |
| 4 | Edmonton | Canada | AB |
| 5 | Vancouver | Canada | BC |
| 6 | Toronto | Canada | ON |
| 7 | San Francisco | United States | CA |
| 8 | Los Angeles | United States | CA |

ROW VECTOR A: | 2 | 100 |
ROW VECTOR B: | 3 | 110 |
ROW VECTOR C: | 7 | 120 |

COLUMN VECTOR A: | 2 | 3 | 7 |
COLUMN VECTOR B: | 100 | 110 | 120 |

FIG. 3

Table 2, Group Identifier 2

JOIN-KEY-TO-GROUP-ID MAPPING 300

| ID 108 | GROUP ID 302 |
|---|---|
| 1 | NULL |
| 2 | 1 |
| 3 | 1 |
| 4 | NULL |
| 5 | NULL |
| 6 | NULL |
| 7 | 2 |
| 8 | 2 |

Key Vector 310

| NULL | NULL | 1 | 1 | NULL | NULL | NULL | 2 | 2 |
|---|---|---|---|---|---|---|---|---|

FIG. 7

DIMENSION TABLE 700

| COUNTRY 702 | STATE 704 | DIMENSION CODE 706 |
|---|---|---|
| Canada | ON | 2 |
| United States | WA | 4 |
| United States | WA | 5 |
| Canada | AB | 0 |
| Canada | BC | 7 |
| Canada | ON | 6 |
| United States | CA | 3 |
| United States | CA | 1 |

DIMENSION CODE DICTIONARY 708

| TOKENS 710 | DIMENSION CODES 712 |
|---|---|
| Edmonton | 0 |
| Los Angeles | 1 |
| Ottawa | 2 |
| San Francisco | 3 |
| Seattle | 4 |
| Spokane | 5 |
| Toronto | 6 |
| Vancouver | 7 |

GROUP DETERMINATION BASED ON MULTI-TABLE DICTIONARY CODES

CROSS-REFERENCE TO RELATED APPLICATIONS; BENEFIT CLAIM

This application claims the benefit of Provisional Appln. 62/563,258, filed Sep. 26, 2017, the entire contents of which is hereby incorporated by reference as if fully set forth herein, under 35 U.S.C. § 119(e).

TECHNICAL FIELD

Embodiments are generally related to information storage and retrieval technology. More specifically, embodiments are related to group determination based on multi-table dictionary codes.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Data Warehouse Schema

A data warehouse schema typically involves at least two types of database tables-a fact table and a dimension table. A fact table is often a relatively large database table that stores transactional data, whereas a dimension table is often a relatively small database table that stores further information related to the transactional data. In the example of FIG. 1, fact table 100 has an identifier column 102 and a transactional amount column 104. In contrast, dimension table 106 has an identifier column 108, a city column 110, a country column 112, and a state column 114 that provide geographical information about the transactional data of fact table 100. For the sake of clarity and ease of explanation, FIG. 1 only depicts one dimension table. However, it should be appreciated that there can be a plurality of dimension tables for one fact table.

Fact table 100 can be joined with dimension table 106 on identifier columns 102 and 108. Such columns are referred to herein as "join columns". Join columns store values referred to herein as "join keys". A join key is a value that is used to perform a join operation. Any of a variety of data types (e.g., integer, string) may be used to implement a join key. For example, identifier column 108 may store integer primary keys, whereas identifier column 102 may store integer foreign keys that correspond to those integer primary keys. Notably, numeric join keys enable efficient join operations as compared to join keys of other data types, such as a string data type, which may necessitate a computationally intensive hash join operation.

Grouped Aggregation Queries

Many database queries involve functions for aggregating fact table data. Non-limiting examples of such functions include min( ), max( ), distinct( ), sum( ), count( ), and average( ). The fact table data to be aggregated is stored in a column referred to herein as a "measure column" or a "row attribute". For example, amount column 104 is the measure column in the database query "SELECT sum(amount_104) FROM fact_table_100".

Some database queries specify that fact table data is to be aggregated according to one or more groups of dimension table rows referred to herein as a "row group". Each row group is determined by the values in one or more columns referred to herein as "grouping columns". For example, country and state columns 112-114 are the grouping columns in the database query "SELECT sum(amount_104) FROM fact_table_100, dimension_table_106 WHERE id_102=id_108 GROUP BY country_112, state_114". Referring to FIG. 1, there may be a row group for cities in Ontario, Canada; another row group for cities in Washington, USA; and so forth. Such database queries are referred to herein as "grouped aggregation queries", because they specify aggregations according to one or more row groups. As used herein, such aggregations are referred to as "grouped aggregations".

Typically, grouped aggregation queries are executed by first joining one or more dimension tables with a fact table and then performing grouped aggregations. However, there are a number of inefficiencies in this approach. For example, joining a dimension table with a large fact table can be expensive in terms of both memory and computational cost. Furthermore, the join operation can be a bottleneck for the subsequent grouped aggregations.

Columnar Database Data

To enable efficient query evaluation, database tables may be stored in a column-major format. Database tables stored in this way are referred to herein as "columnar database data". In column-major format, a column of values is stored contiguously within a memory address space.

For example, in row-major format, the first three rows of fact table 100 may be stored as Row Vector A, Row Vector B, and Row Vector C. In each of these row vectors, the first element is a value of identifier column 102, and the second element is a value of amount column 104. However, in column-major format, the first three rows of fact table 100 may be stored in Column Vector A and Column Vector B. Notably, the values of identifier column 102 are stored contiguously and in a separate structure from the values of amount column 104. Rows can be determined based on matching index values. For example, the first row of fact table 100 contains the values "2" and "100"; these values are stored at index position "0" in each of Column Vector A and Column Vector B. Although a vector is used in the examples herein, it should be appreciated that an array or some other data structure may be used instead without deviating from the scope of the disclosure.

Advantageously, columnar database data enables many kinds of database operations that can be performed efficiently, because column values are stored contiguously in memory. For example, aggregating the values of amount column 102 may be performed while scanning Column Vector A.

Join-Key-to-Group-ID Mappings

To further enable efficient query evaluation, grouped aggregations may be performed before any join operations. This can be achieved based on rewriting queries to use join-key-to-group-identifier mappings. Join-key-to-group-identifier mappings correlate join keys to "group identifiers". As used herein, a group identifier refers to a value that represents a row group. Any of a variety of data types (e.g., integer, string) may be used to implement a group identifier. Referring to FIG. 2, the numeric group identifier "1" is assigned to the row group comprising cities in Washington, USA; whereas the numeric group identifier "2" is assigned to the row group comprising cities in California, USA. As compared with group identifiers of other data types, such as a string data type, numeric group identifiers offer a number of benefits for efficient data processing. Not only can numeric identifiers serve as index values for accessing a data structure, they also enable join operations that do not involve hash functions.

Join-key-to-group-identifier mappings can be used to translate join keys into group identifiers, thereby enabling grouped aggregations that are not preceded by expensive join operations. Described in detail over the course of the subsequent paragraphs are the mechanisms by which join-key-to-group-identifier mappings enable performing grouped aggregations efficiently. Advantageously, such mechanisms enable a greater degree of parallel computation.

As mentioned above, join-key-to-group-identifier mappings comprise group identifiers. Group identifiers are generated based on processing dimension tables. In the case of multiple dimension tables, a set of one or more group identifiers can be generated for each dimension table.

In the example of FIG. 2, group identifiers are generated in the course of generating a row-group-to-group-identifier mapping 200. More specifically, while scanning dimension table 106, one or more group identifiers are generated and stored in row-group-to-group identifier mapping 200. Row-group-to-group-identifier mapping 200 may be a database table, temporary or otherwise, that comprises a group identifier column 206. Group identifier column 206 stores a respective group identifier for each row group. For reasons that will be explained below, a row-group-to-group-identifier mapping may also comprise other columns, such as a country column 202 and a state column 204.

Prior to generating row-group-to-group-identifier mapping 200, the following grouped aggregation query is received:

Grouped Aggregation Query A

SELECT country, state, sum(amount)
    FROM fact_table f, dimension_table d
    WHERE f.id=d.id AND state IN ('WA', 'CA')
    GROUP BY country, state Grouped Aggregation Query A specifies two row groups for dimension table 106—one row group for cities in Washington, USA; and another row group for cities in California, USA. Accordingly, row-group-to-group-identifier mapping 200 has two entries, each entry mapping a row group to a corresponding group identifier.

Notably, Grouped Aggregation Query A comprises the predicate condition "WHERE . . . state IN ('WA', 'CA')". If a grouped aggregation query comprises a predicate condition, it is typically more efficient to evaluate the predicate condition over the relatively smaller dimension table instead of the relatively larger database table resulting from joining the fact table with the dimension table. Thus, any dimension table rows that fail to satisfy the predicate condition are not included in a row group. In the examples herein, such rows are depicted as having a group identifier of "null" to indicate exclusion from any row groups. As will be described in greater detail below, this enables early filtering on the predicate condition, thereby reducing the amount of data subjected to further processing.

As mentioned above, a join-key-to-group-identifier mapping correlates a set of one or more join keys to a set of one or more group identifiers. A join-key-to-group-identifier mapping can be generated based on scanning dimension table 106 to determine a group identifier for each dimension row. Referring to FIG. 3, join-key-to-group-identifier mapping 300 is depicted in a tabular format for the sake of providing a clear example. Each entry of join-key-to-group-identifier mapping 300 correlates a value of identifier column 108 to a group identifier 302. However, to minimize its memory footprint and to enable relatively fast lookups, join-key-to-group-identifier mapping 300 is typically implemented as the Key Vector 310. Notably, the values of identifier column 108 correspond to the index positions of the group identifiers stored in Key Vector 310. To enable this correspondence, an extra null value is inserted at index position "0". However, implementations without zero-indexed vectors also fall within the scope of the present disclosure.

When generated, a join-key-to-group-identifier mapping can be used to efficiently process fact table data, thereby facilitating an aggregation across multiple tables without having first performed a join operation. Referring to FIG. 4, join-key-to-group-identifier mapping 300 can be used to determine which rows of fact table 100 correspond to which group identifiers. This determination is based on matching the values of identifier column 102 with the index values of join-key-to-group-identifier mapping 300. For the purpose of providing a clear example, FIG. 4 depicts arrows representing the application of join-key-to-group-identifier mapping 300 to only the first eight rows of fact table 100. As indicated by the dashed arrows, join-key-to-group-identifier mapping 300 can be used to filter out fact table rows that are not included in any row group. Accordingly, further processing of such rows can be avoided.

For the sake of clarity and ease of explanation, FIG. 4 depicts the application of join-key-to-group-identifier mapping 300 to fact table 100 as a whole. However, some implementations involve applying join-key-to-group-identifier mapping 300 to fact table 100 stored as columnar database data. For example, join-key-to-group-identifier mapping 300 may be applied to a column vector that stores less than all of the values of identifier column 102. This may generate a bitmap or some other structure for determining which values of amount column 104 correspond to which group identifiers. Using this new structure, grouped aggregation may be performed while scanning the values of amount column 104.

Grouped aggregation itself can be performed in any of a variety of ways. FIG. 4 depicts an approach for grouped aggregation that involves accumulation space 400. An accumulation space may be an array, a temporary table, or some other structure into which values of a measure column are accumulated. Referring to FIG. 4, accumulation space 400 has a separate memory location allocated for each group identifier 402. Each memory location stores a cumulative amount 404 that can be accessed using a respective group identifier 402.

In some cases, a grouped aggregation query may involve multiple dimension tables, each of which has its own set of group identifiers. In such cases, an accumulation space may store a set of one or more group identifiers for each dimension table. For example, if a first dimension table has a set of two group identifiers and a second dimension table has a set of four group identifiers, an accumulation space may be implemented as the 2×4 array Multi-Dimensional Accumulation Space 410. Notably, each box stores a cumulative total for a different combination of group identifiers.

After performing grouped aggregations, the resulting values can be returned along with row group information. FIG. 5 depicts an approach for returning the resulting values in a tabular format. Result table 500 can be generated based on joining row-group-to-group-identifier mapping 200 and accumulation space 400 on group identifiers 206 and 402. Advantageously, the cost of the join operation involved in FIG. 5 is significantly lower than the cost of joining fact table 100 and dimension table 106.

Notably, the numeric join keys of dimension table 106 uniquely map to the text values of city column 110. As such, these join keys can be referred to as "surrogate values" for the city names. Performing operations on surrogate values is typically more efficient than performing operations on the values represented by surrogate values. For example, working with integer values can avoid costly hash lookups that may otherwise be involved with string values. However, there are many different kinds of surrogate values.

Dictionary Compression

In particular, dictionary codes can serve as surrogate values. Database data can be stored in a compressed format to conserve space in memory. Often used is a lightweight compression technique known as "dictionary encoding". Dictionary encoding enables data comprising a relatively large number of bits to be represented by data comprising a relatively small number of bits. The relatively large number of bits is hereinafter referred to as a "token", and the relatively small number of bits is hereinafter referred to as a "code". A token corresponds to a value of database data, and a code corresponds to an encoded representation of a token.

Referring to FIG. 6, fact table portion 600A comprises an encoded sub-column 602A that has been compressed using fact code dictionary 606. Fact code dictionary 606 uniquely maps tokens 608 to codes 610 and/or vice versa. Advantageously, sub-column 602A stores numeric codes instead of city name tokens, thereby achieving a significant savings in memory utilization. As such, sub-column 602A can fit in relatively fast but small memory, such as dynamic random-access memory (DRAM), where queries can be executed against it relatively quickly.

For the purpose of providing a clear example, amount sub-column 604A is depicted in an uncompressed format. However, it should be appreciated that multiple columns of a database table can be encoded, each column being compressed based on a different set of one or more code dictionaries. As used herein, a "code dictionary" collectively refers to an encoding dictionary and a decoding dictionary. An encoding dictionary is a token-to-code mapping that enables compression, and a decoding dictionary is a code-to-token mapping that enables decompression.

Although FIG. 6 depicts tokens and codes as values of particular data types, it should be appreciated that the particular data types used may vary from implementation to implementation. However, to realize space savings, codes preferably comprise fewer bits than tokens.

Local Versus Global Dictionaries

Depending on how much of a particular column of database data is associated with a code dictionary, the code dictionary may be characterized as "local" or "global". As used herein, a code dictionary is said to be "for" or "associated with" database data if the code dictionary is to be used for compressing and/or decompressing the database data.

A local dictionary is typically associated with less than all values of a column of a database table. Referring to FIG. 6, fact table 600 is divided into fact table portions 600A-B, thereby dividing column 602 into sub-columns 602A-B. Sub-column 602A is associated with fact code dictionary 606, and sub-column 602B is associated with fact code dictionary 612. Notably, fact code dictionaries 606 and 612 are different mappings, because they are local dictionaries.

Although FIG. 6 depicts different local dictionaries for different portions of a fact table, some implementations may instead employ a global dictionary. A global dictionary is associated with an entire column of a database table. Referring to FIG. 7, dimension table 700 comprises code column 706, which stores encoded city names. Notably, the entirety of code column 706 is associated with dimension code dictionary 708. Thus, even if code column 706 were divided into two code sub-columns, each sub-column would still be associated with dimension code dictionary 708, because it is a global dictionary. In other words, the mapping between tokens 710 and codes 712 do not vary between subsets of code column 706.

Although FIG. 7 depicts dimension code dictionary 708 as a global dictionary, some implementations may instead divide dimension code column 706 into subsets, each of which has its own local dictionary.

Non-Numeric-Join-Key-to-Group-Identifier Mappings

Regardless of whether fact and dimension tables are associated with local or global dictionaries, one or more dictionaries for a join column of a fact table may be significantly different from one or more dictionaries for a join column of a dimension table. For example, in fact code dictionary 612, the token "Los Angeles" maps to the code "0", but in dimension code dictionary 708, the same token maps to the code "1". This is because a fact table and a dimension table are different database tables, and a local/global dictionary may vary from table to table.

Stated differently, unlike join keys, local/global dictionary codes may be inconsistent across multiple database tables. Thus, to enable performing grouped aggregations before any join operations, a join-key-to-group-identifier mapping may be generated for join keys that are compressed using different dictionaries. A join-key-to-group-identifier mapping correlates join keys, in their non-surrogate form, to group identifiers.

In the example of FIG. 8, the following grouped aggregation query is received:

Grouped Aggregation Query B

SELECT country, state, sum(amount)
FROM fact_table f, dimension_table d
WHERE f.city=d.city AND state IN ('WA', 'CA')
GROUP BY country, state Notably, the join keys are the uncompressed/decompressed values of code columns 602 and 706. As mentioned above, in the absence of numeric join keys, evaluating this query would typically involve a costly hash join operation on text values.

To avoid such a costly join operation, join-key-to-group-identifier mapping 800 is generated. In some implementations, this may be achieved by using dimension code dictionary 708 to decompress dimension table 700, which is also scanned to determine a group identifier for each dimension row. Thus, each entry of the resulting join-key-to-group-identifier mapping 800 correlates a name of a city 802 to a group identifier 804.

Notably, join-key-to-group-identifier mapping 800 is consistent across fact table 600 and dimension table 700. This is because a join-key-to-group-identifier mapping does not comprise any local/global codes, which can be inconsistent across multiple database tables.

Fact-Code-to-Group-Identifier Mappings

However, the absence of dictionary codes makes it difficult to directly apply a join-key-to-group-identifier mapping to the compressed values of a fact table. Thus, depending on whether the fact table is associated with a global dictionary or a plurality of local dictionaries, one or more fact-code-to-group-identifier mappings may be generated. A fact-code-to-group-identifier mapping correlates fact table dictionary codes to one or more group identifiers.

Referring to FIG. 9, fact-code-to-group-identifier mapping 900 correlates each of codes 616 to a group identifier 902. Fact-code-to-group-identifier mapping 900 is generated based on matching tokens 614 of fact code dictionary 612 with names of cities in join-key-to-group-identifier mapping 800. Notably, matching non-numeric values may involve a hash function.

Fact-code-to-group-identifier mapping 900 is depicted in a tabular format for the purpose of providing a clear example. However, to minimize its memory footprint and to enable relatively fast lookups, fact-code-to-group-identifier mapping 900 is typically implemented as the following vector:

| Fact-Code-to-Group-Identifier Vector | | | | | |
|---|---|---|---|---|---|
| 2 | 2 | 1 | 1 | NULL | NULL |

Notably, Fact-Code-to-Group-Identifier Vector stores group identifiers at index positions that correspond to codes 616.

Like a join-key-to-group-identifier mapping, a fact-code-to-group-identifier mapping can be used to correlate a surrogate value to a group identifier. However, if a fact table is associated with multiple local dictionaries, a fact-code-to-group-identifier mapping is typically generated for each local dictionary. Thus, different fact-code-to-group-identifier mappings may be applied to different portions of a fact table.

Group Determination Based on Local/Global Dictionary Codes

Grouped aggregations can be performed based on applying a fact-code-to-group-identifier mapping to one or more parts of a fact table. FIGS. 10-11 depict an example approach for performing grouped aggregations on columnar database data. For the sake of clarity and ease of explanation, FIGS. 10-11 depict generating and using fact-row-to-group-identifier mapping 1000 as an intermediate result. However, it should be appreciated that, for various performance reasons, such an intermediate result is typically neither generated nor used for performing grouped aggregations. A more efficient approach will be described later in this section.

In the example of FIG. 10, fact-code-to-group-identifier mapping 900 is used to translate each code of code sub-column 602B into a group identifier 1002 of fact-row-to-group-identifier mapping 1000. Notably, the nth element of fact-row-to-group-identifier mapping 1000 corresponds to the nth row of code sub-column 602B.

For the purpose of providing a clear example, FIG. 10 depicts arrows representing application of fact-code-to-group-identifier mapping 900 to only the first four rows of code sub-column 602B. More specifically, each row of fact sub-column 602B is correlated with a group identifier 902 based on matching the codes of sub-column 602B with codes 616 of fact-code-to-group-identifier mapping 900.

In the example of FIG. 11, grouped aggregations are performed based on applying fact-row-to-group-identifier mapping 1000 to amount sub-column 604B. As mentioned above, each element of fact-row-to-group-identifier mapping 1000 corresponds to a row of fact table portion 600B. Thus, each "row" of fact-row-to-group-identifier mapping 1000 is matched with a row of amount sub-column 604B to correlate a group identifier 1002 with a corresponding value of amount sub-column 604B.

For the purpose of providing a clear example, FIG. 11 depicts arrows representing application of fact-row-to-group-identifier mapping 1000 to only the first four rows of amount sub-column 604B. Advantageously, fact-row-to-group-identifier mapping 1000 can be used to filter out values of amount sub-column 604B that fail to satisfy a predicate condition. This is depicted in FIG. 11 using a dashed arrow. The values of amount sub-column 604B that have not been filtered out are stored as per-group cumulative totals in accumulation space 1100.

As mentioned above, an embodiment that generates and uses a fact-row-to-grouping identifier mapping may be inefficient in terms of both space and time. Accordingly, a more efficient approach may involve scanning code sub-column 602B and looking up codes in fact-code-to-group-identifier mapping 900. In some embodiments, this is achieved based on a loop counter, which can be implemented using the variable i. Conceptually, this variable can be used to index into amount sub-column 604B, thereby correlating an element of code sub-column 602B with an element of amount sub-column 604B that shares the same row. Thus, when fact-code-to-group-identifier mapping 900 indicates that a non-null group identifier is correlated with an element of code sub-column 602B, a corresponding element of amount sub-column 604B can be accumulated into a memory location of accumulation space 1100 for that non-null group identifier.

Accumulation space 1100 may be similar or identical to accumulation space 400 or the Multi-Dimensional Accumulation Space described above. Like accumulation space 400, accumulation space 1100 has a separate memory location allocated for each group identifier 1102, and each memory location stores a cumulative amount 1104 for a respective group identifier 1102.

However, if a fact table is associated with multiple local dictionaries, a fact-code-to-group-identifier mapping is generated for each fact table portion. Furthermore, each fact-code-to-group-identifier mapping is separately applied to a respective fact table portion to accumulate values into the same accumulation space. Thus, storing cumulative totals into accumulation space 1100 can be a bottleneck.

When one or more cumulative totals have been computed, a query result may be generated using a process similar to that depicted in FIG. 5. This may involve a relatively inexpensive join operation between a row-group-to-group-identifier mapping and accumulation space 1100.

As mentioned above, the example approach depicted in FIGS. 6-11 enables performing grouped aggregations before any join operations when working with dictionary-compressed join keys. However, there are a number of inefficiencies in the aforementioned approach. Matching text values between a fact code dictionary and a join-key-to-group-identifier mapping involves hash tables, which can result in a relatively slow and costly process. Furthermore, a large amount of memory is consumed in generating the multiple data structures involved in performing grouped aggregations on join keys encoded using local/global dictionaries.

BRIEF DESCRIPTION OF THE DRAWINGS

In the drawings:

FIG. 3 depicts an example join-key-to-group-identifier mapping.

FIG. 7 depicts an example encoded dimension column.

Figure 1:
FIG. 1 depicts example fact and dimension tables.
Figure 2:
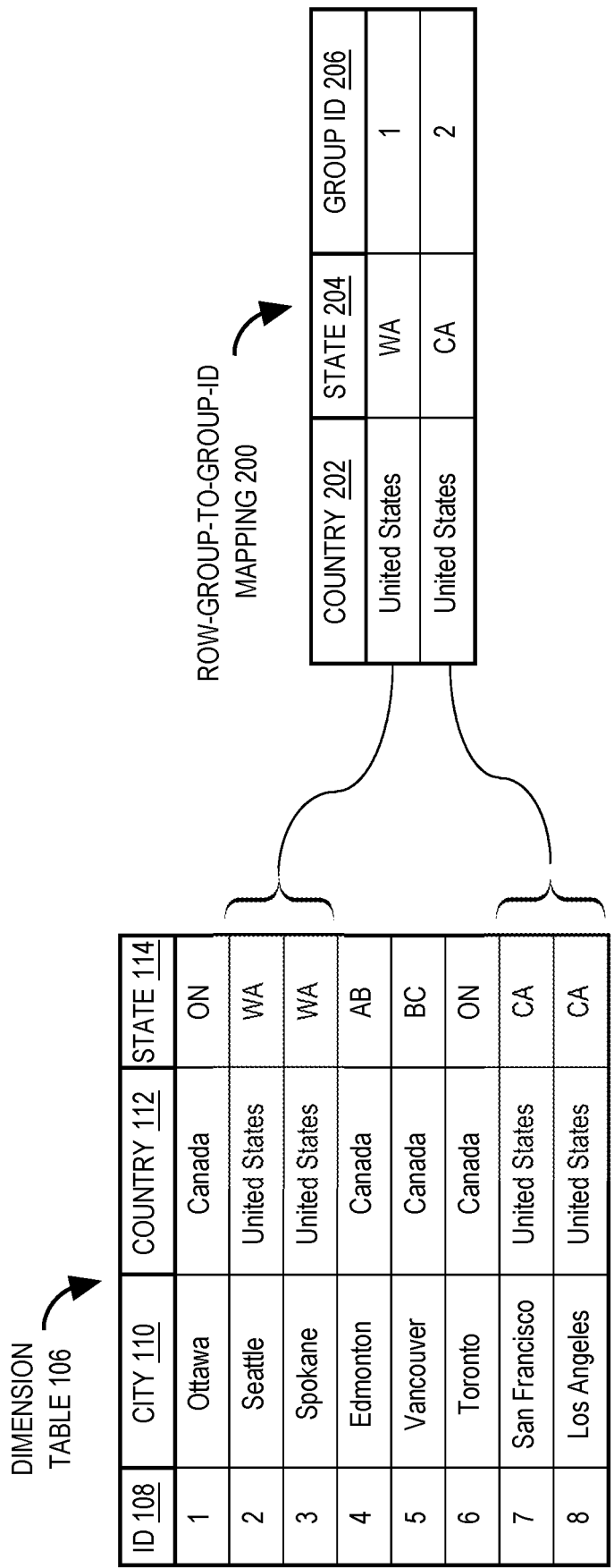
FIG. 2 depicts an example row-group-to-group-identifier mapping.
Figure 4:
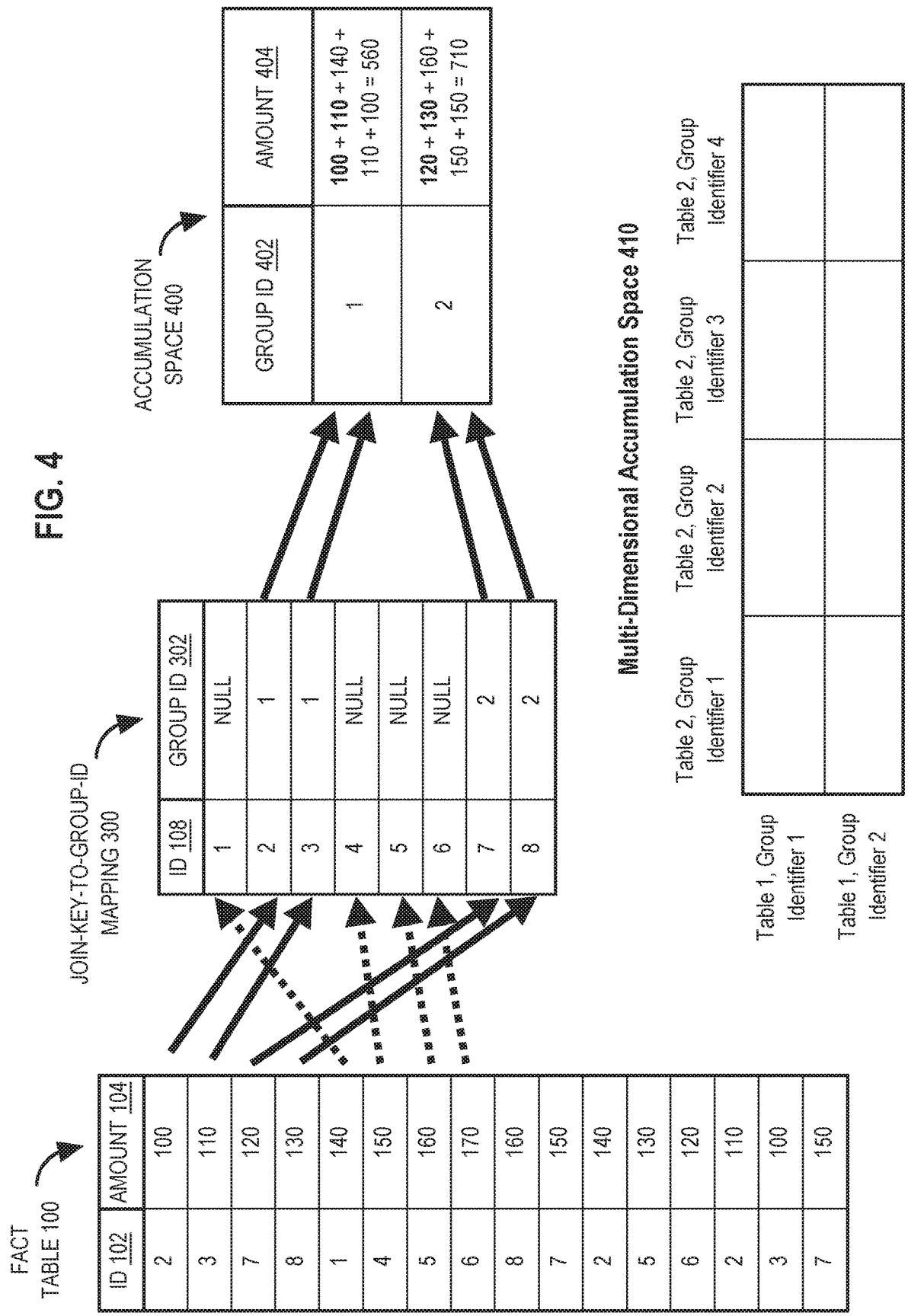
FIG. 4 depicts an example approach for performing an aggregation based on a join-key-to-group-identifier mapping.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" are used to differentiate elements and do not necessarily indicate any particular order.

INTRODUCTION

To efficiently evaluate a grouped aggregation query involving dictionary-compressed join keys, grouped aggregations are performed before any join operations. More specifically, when the grouped aggregation query involves join keys that are compressed using a "domain dictionary", a domain-code-to-group-identifier mapping can be generated for efficient query evaluation.

A domain dictionary is a global dictionary associated with two or more database tables. Thus, domain dictionary codes can be consistent across both a fact table and a dimension table. This means a code-to-group-identifier mapping can be generated without first generating a join-key-to-group-identifier mapping. Advantageously, the relatively slow and costly process of matching text or other non-numeric values can be avoided. Decompressing the dimension table can also be avoided.

Furthermore, a single code-to-group-identifier mapping can be generated instead of multiple code-to-group-identifier mappings. This significantly reduces the memory overhead that would otherwise be incurred when performing grouped aggregations.

Domain Dictionaries

Figure 12:
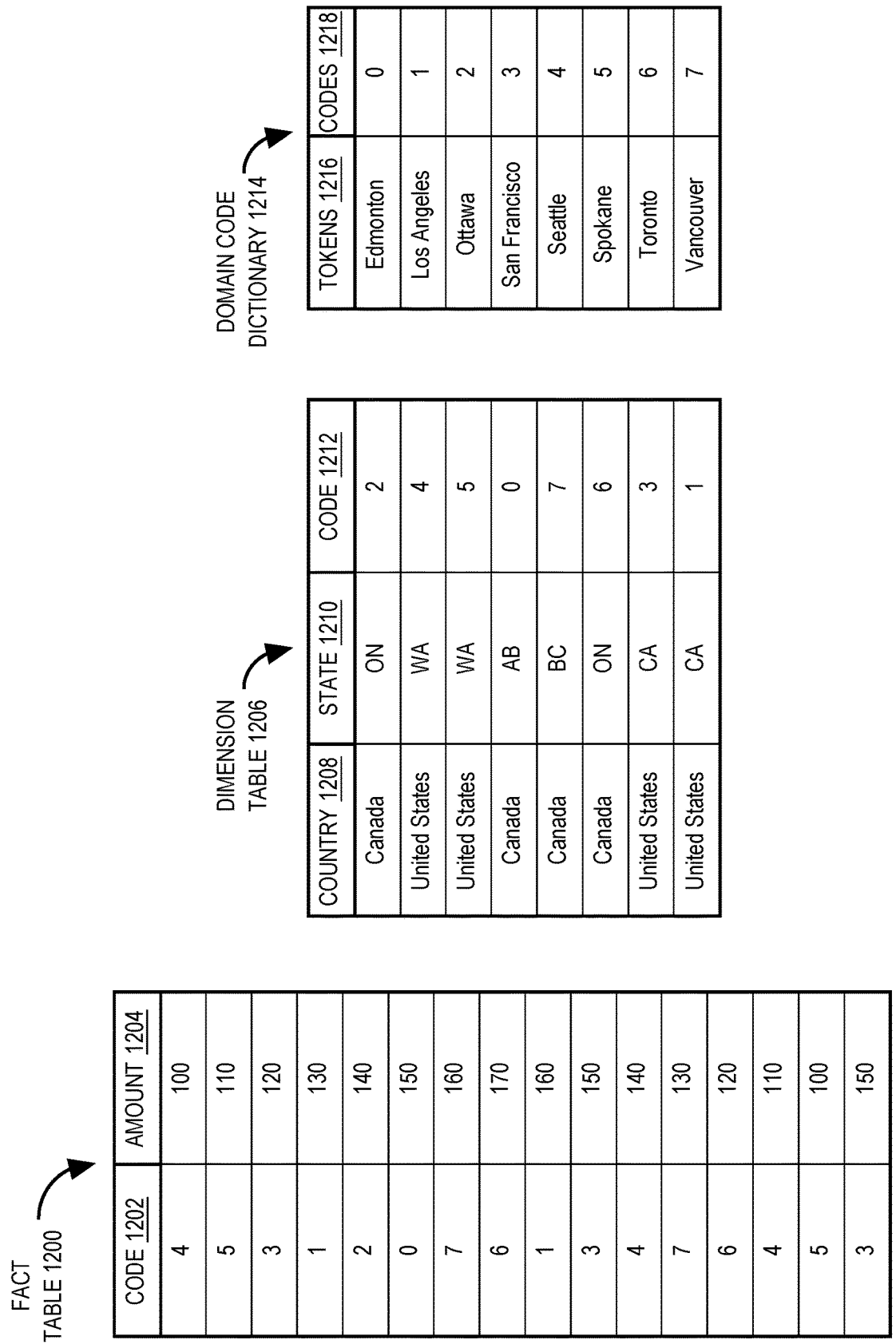
FIG. 12 depicts an example domain code dictionary.

As mentioned above, a domain dictionary comprises codes that can be consistent across both a fact table and a dimension table. Referring to FIG. 12, domain code dictionary 1214 is associated with fact table 1200 and dimension table 1206, both of which may be stored in a data warehouse. Domain code dictionary 1214 correlates tokens 1216 with codes 1218. Tokens 1216 comprise the unencoded/decoded join keys of tables 1200 and 1206; and codes 1218 comprise the encoded join keys of columns 1202 and 1212.

Fact table 1200 comprises a code column 1202 that stores encoded join keys. In the example of FIG. 12, code column 1202 stores domain dictionary codes that represent city names. In other words, the city names of fact table 1200 have been encoded using domain code dictionary 1214.

Dimension table 1206 comprises a code column 1212 that also stores encoded join keys. Significantly, domain code dictionary 1214 has also been used to generate code column 1212. Thus, the domain dictionary codes are consistent across code columns 1202 and 1212. For example, the code "4" in fact table 1200 represents the token "Seattle", and the code "4" in dimension table 1206 also represents the token "Seattle".

For the sake of providing a clear example, the values of amount column 1204, country column 1208, and state column 1210 are depicted in an uncompressed format. However, it should be appreciated that these columns are also typically compressed albeit using different dictionaries.

Domain-Code-to-Group-Identifier Mappings

As mentioned above, since domain dictionary codes can be consistent across both a fact table and a dimension table, a code-to-group-identifier mapping can be generated without first generating a join-key-to-group-identifier mapping. Notably, this code-to-group-identifier mapping will be a domain-code-to-group-identifier mapping, because it comprises domain dictionary codes.

Figure 13:
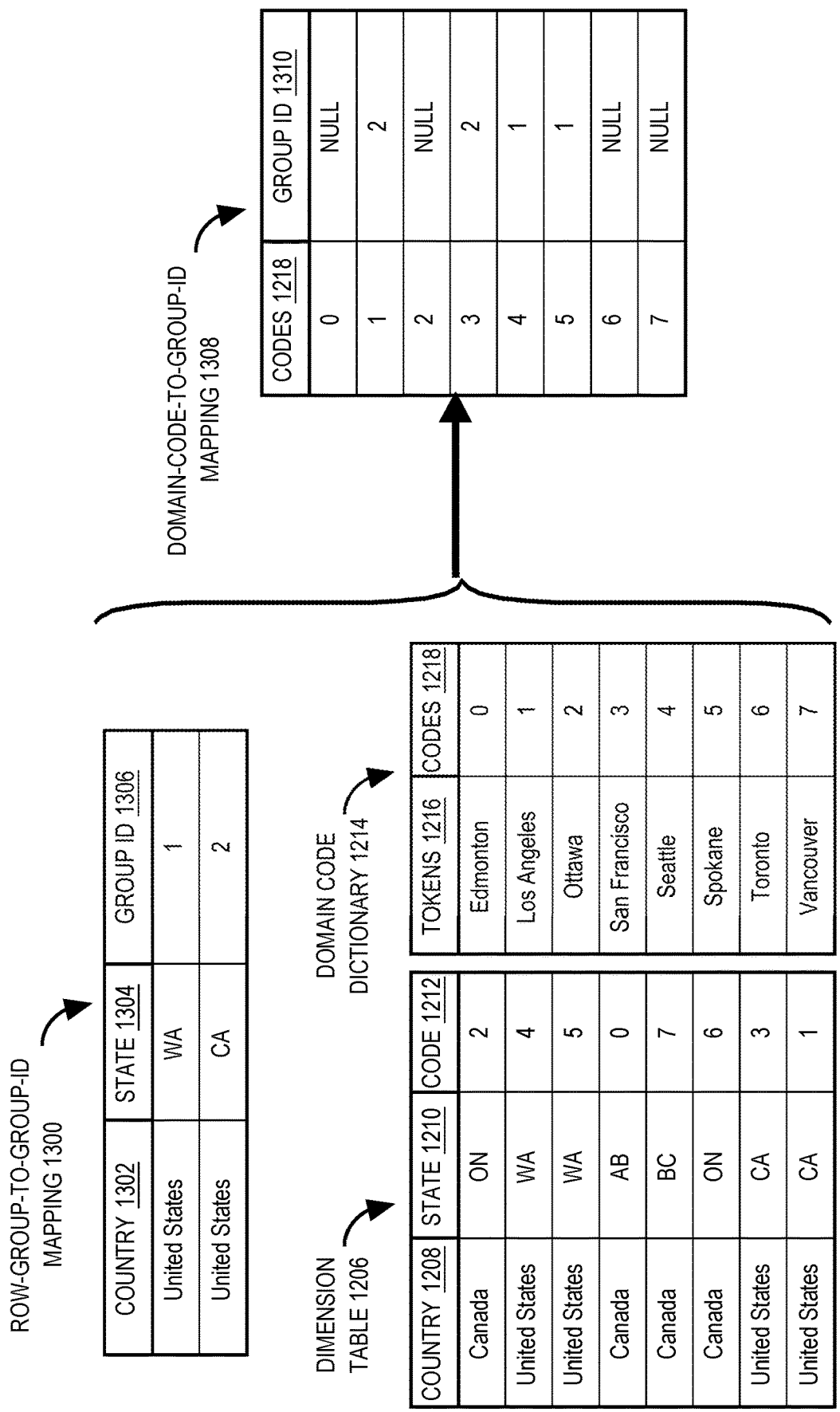
FIG. 13 depicts an example domain-code-to-group-identifier mapping.

In the example of FIG. 13, Grouped Aggregation Query B is received, but this time, domain-code-to-group-identifier mapping 1300 is generated. In some embodiments, this is achieved based on scanning dimension table 1206 to determine a group identifier for each dimension row. Notably, it is unnecessary to decompress any part of dimension table 1206 when generating domain-code-to-group-identifier mapping 1300. The resulting domain-code-to-group-identifier mapping 1300 correlates each of codes 1218 to a group identifier 1302.

Domain-code-to-group-identifier mapping 1300 is depicted in a tabular format for the purpose of providing a clear example. However, to minimize its memory footprint and to enable relatively fast lookups, domain-code-to-group-identifier mapping 1300 can be implemented as the following vector:

| Domain-Code-to-Group-Identifier Vector | | | | | | | |
|---|---|---|---|---|---|---|---|
| NULL | 2 | NULL | 2 | 1 | 1 | NULL | NULL |

Notably, Domain-Code-to-Group-Identifier Vector stores group identifiers at index positions that correspond to codes 1218.

In some embodiments, these index positions may also correspond to the index positions of tokens 1216. For example, domain code dictionary 1214 may comprise a decoding dictionary that is implemented as the following vector: P

| Decoding Dictionary Vector | | | | | | | |
|---|---|---|---|---|---|---|---|
| Edmonton | Los Angeles | Ottawa | San Francisco | Seattle | Spokane | Toronto | Vancouver |

Thus, it can be said that Domain-Code-to-Group-Identifier Vector is indexed to/indexed aligned with Decoding Dictionary Vector.

Notably, the resulting domain-code-to-group-identifier mapping 1300 is consistent across fact table 1200 and dimension table 1206. This is because domain dictionary codes are consistent across multiple database tables.

Group Determination Based on Domain Dictionary Codes

Figure 14:
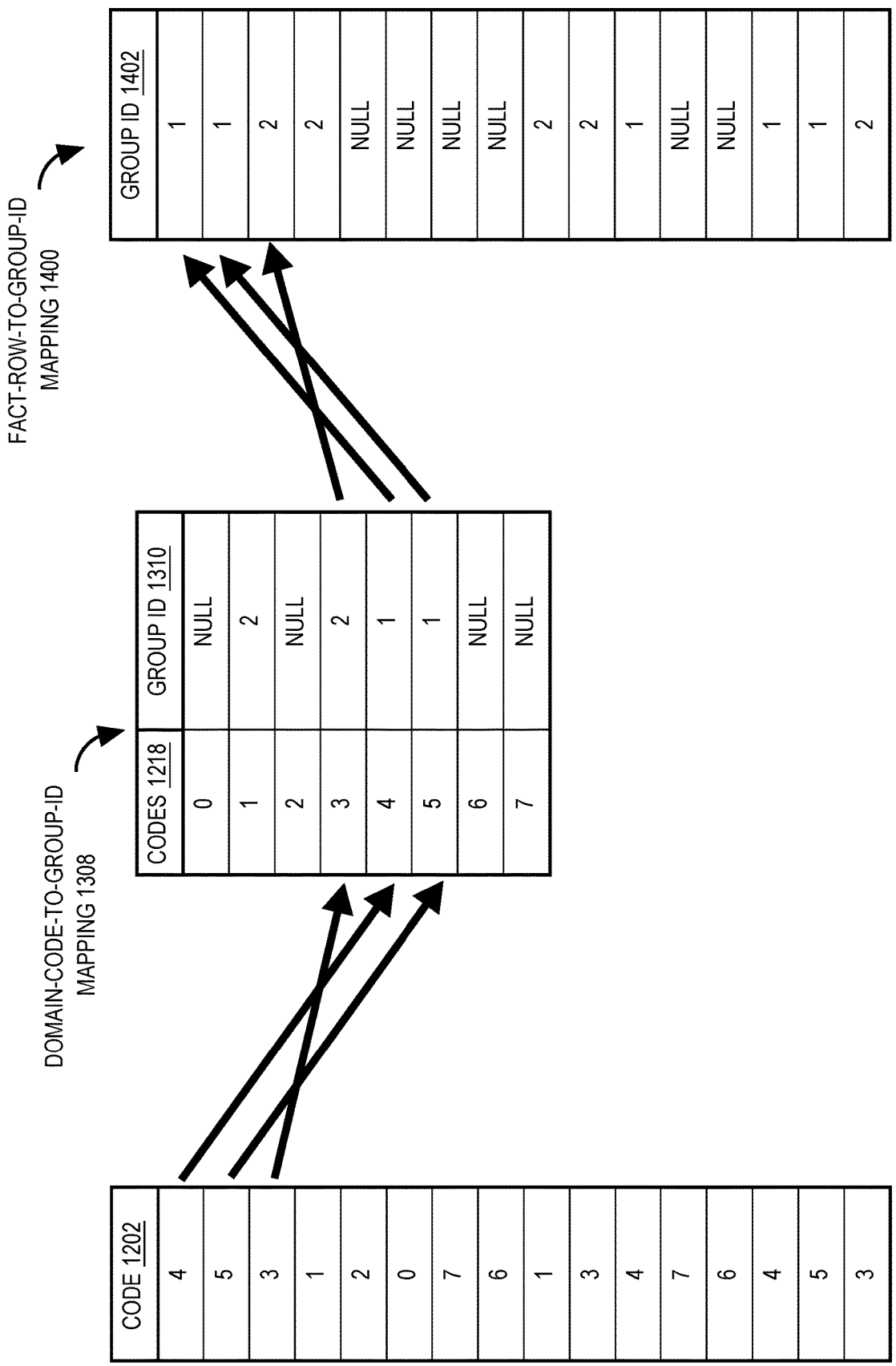
FIG. 14 depicts an example approach for generating a fact-row-to-group-identifier mapping based on a domain-code-to-group-identifier mapping.
Figure 15:
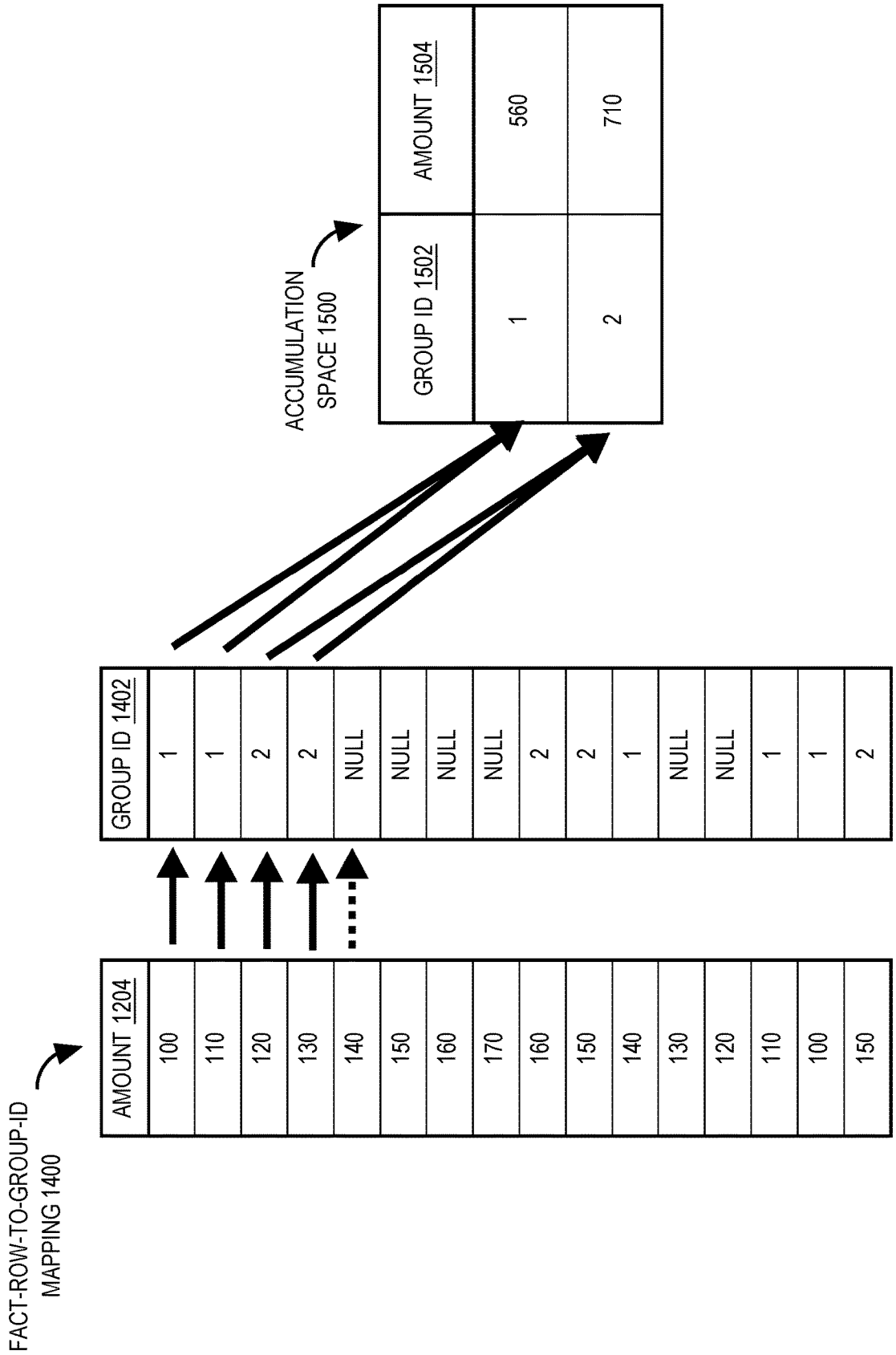
FIG. 15 depicts an example approach for performing an aggregation based on a fact-row-to-group-identifier mapping.

Grouped aggregations can be performed based on applying a domain-code-to-group-identifier mapping to a fact table. FIGS. 14-15 depict an example approach for performing grouped aggregations on columnar database data. For the sake of clarity and ease of explanation, a fact-row-to-group-identifier mapping is depicted in the example approach. However, it should be appreciated that, for various performance reasons, this structure may be neither generated nor used for performing grouped aggregations. A more efficient approach will be described later in this section.

Referring to FIG. 14, domain-code-to-group-identifier mapping 1300 is used to translate each code of fact code column 1202 into a group identifier 1402 of fact-row-to-group-identifier mapping 1400. Fact-row-to-group-identifier mapping 1400 correlates each row of code column 1202 to a group identifier 1402. In other words, fact-row-to-group-identifier mapping 1400 enables determining a row group for each row of fact table 1200. Notably, the nth element of fact-row-to-group-identifier mapping 1400 corresponds to the nth row of code column 1202.

For the purpose of providing a clear example, FIG. 14 depicts arrows representing application of domain-code-to-group-identifier mapping 1300 to only the first three rows of code column 1202. More specifically, each row of column 1202 is correlated with a group identifier 1302 based on matching the codes of column 1202 with codes 1218 of domain-code-to-group-identifier mapping 1300.

Referring to FIG. 15, grouped aggregations are performed based on applying fact-row-to-group-identifier mapping 1400 to amount column 1204. As mentioned above, amount column 1204 is the attribute of fact table 1200 to be aggregated in row groups.

Each element of fact-row-to-group-identifier mapping 1400 corresponds to a row of fact table 1200. Thus, each "row" of fact-row-to-group-identifier mapping 1400 is matched with a row of amount column 1204 to correlate a group identifier 1402 with a corresponding value of amount column 1204.

For the purpose of providing a clear example, FIG. 15 depicts arrows representing application of fact-row-to-group-identifier mapping 1400 to only the first five rows of amount column 1204. Advantageously, fact-row-to-group-identifier mapping 1400 can be used to filter out values of amount column 1204 that fail to satisfy a predicate condition. This is depicted in FIG. 15 using a dashed arrow. The values of amount column 1204 that have not been filtered out are stored as per-group cumulative totals in accumulation space 1500.

As mentioned above, an embodiment that generates and uses a fact-row-to-grouping identifier mapping may be inefficient in terms of both space and time. Accordingly, a more efficient approach may involve scanning code column 1202 and looking up codes in domain-code-to-group-identifier mapping 1300. In some embodiments, this is achieved based on a loop counter, which can be implemented using the variable i. Conceptually, this variable can be used to index into amount column 1204, thereby correlating an element of code column 1202 with an element of amount column 1204 that shares the same row. Thus, when domain-code-to-group-identifier mapping 1300 indicates that a non-null group identifier is correlated with an element of code column 1202, a corresponding element of amount column 1204 can be accumulated into a memory location of accumulation space 1500 for that non-null group identifier.

Accumulation space 1500 may be similar or identical to accumulation space 1100 described above. Accumulation space 1500 has a separate memory location allocated for each group identifier 1502, and each memory location stores a cumulative amount 1504 for a respective group identifier 1502.

Figure 5:
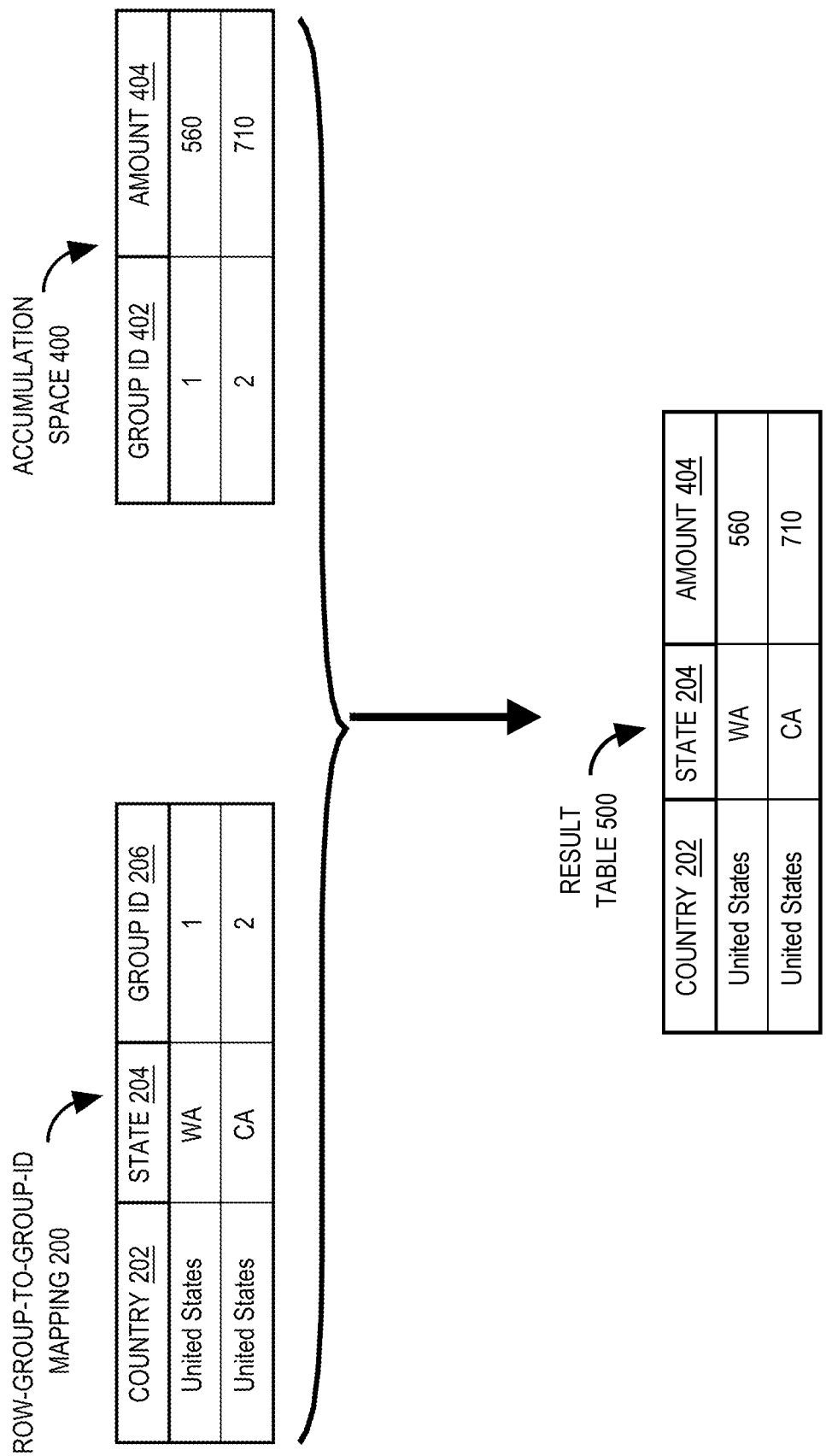
FIG. 5 depicts an example result table.
Figure 6:
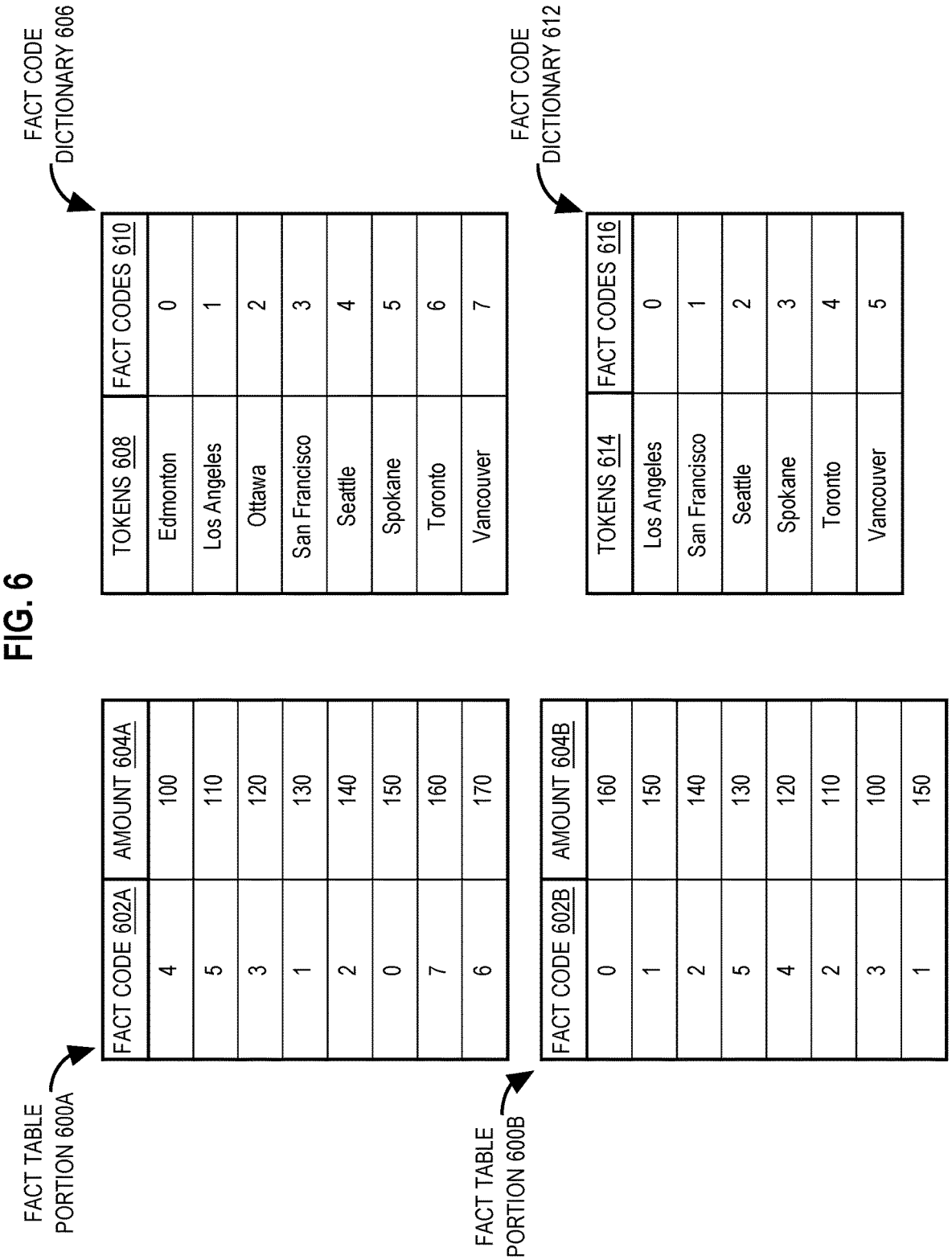
FIG. 6 depicts example local dictionaries.
Figure 8:
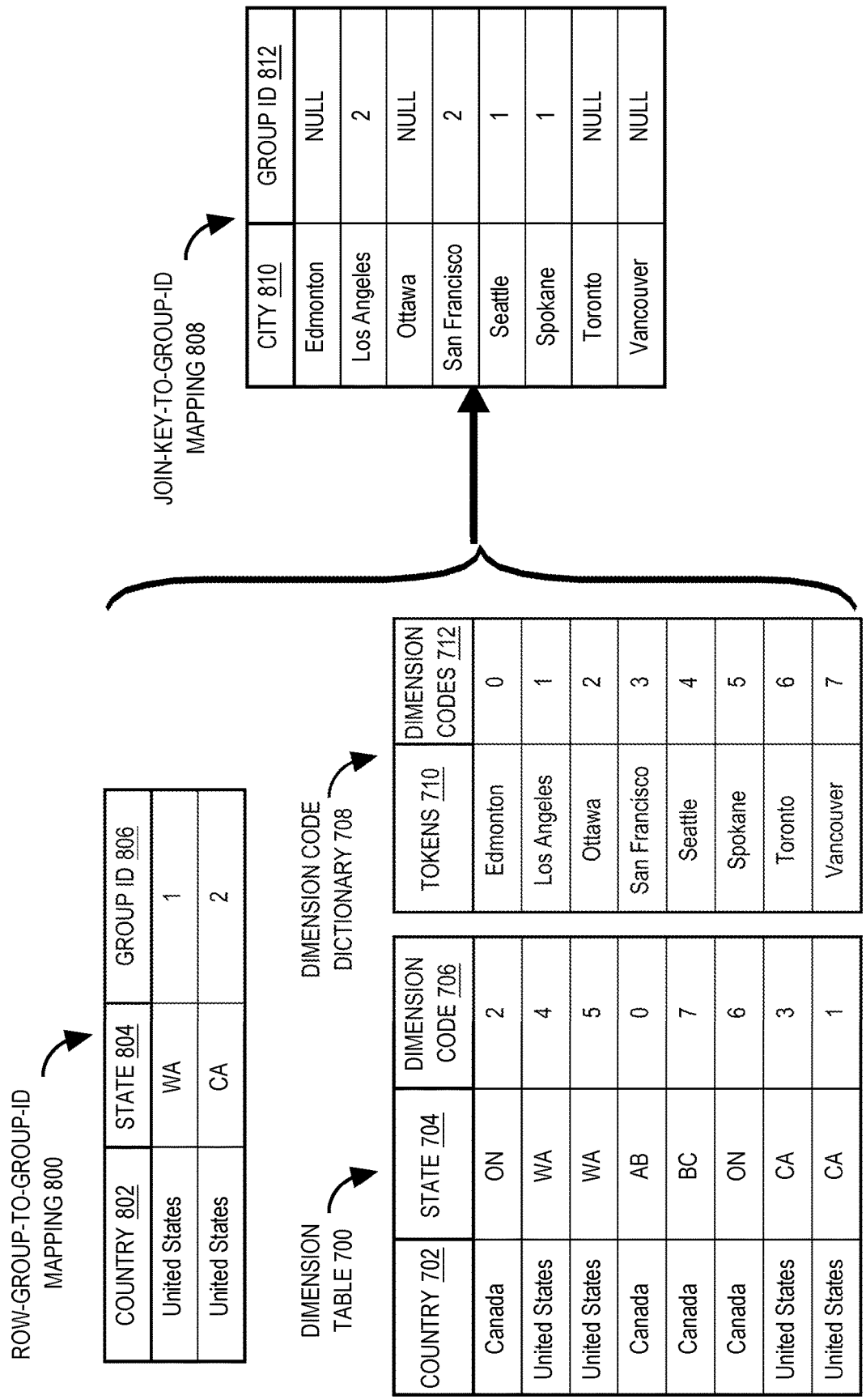
FIG. 8 depicts an example join-key-to-group-identifier mapping.
Figure 9:
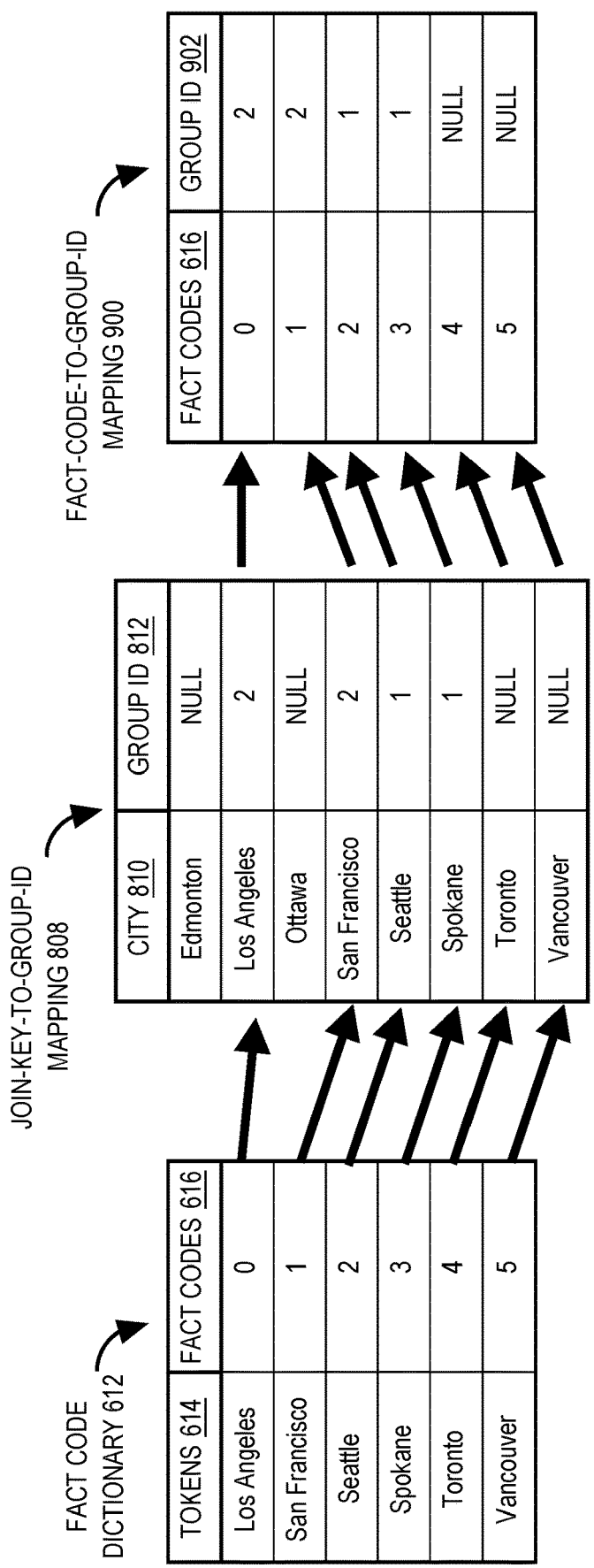
FIG. 9 depicts an example fact-code-to-group-identifier mapping.
Figure 10:
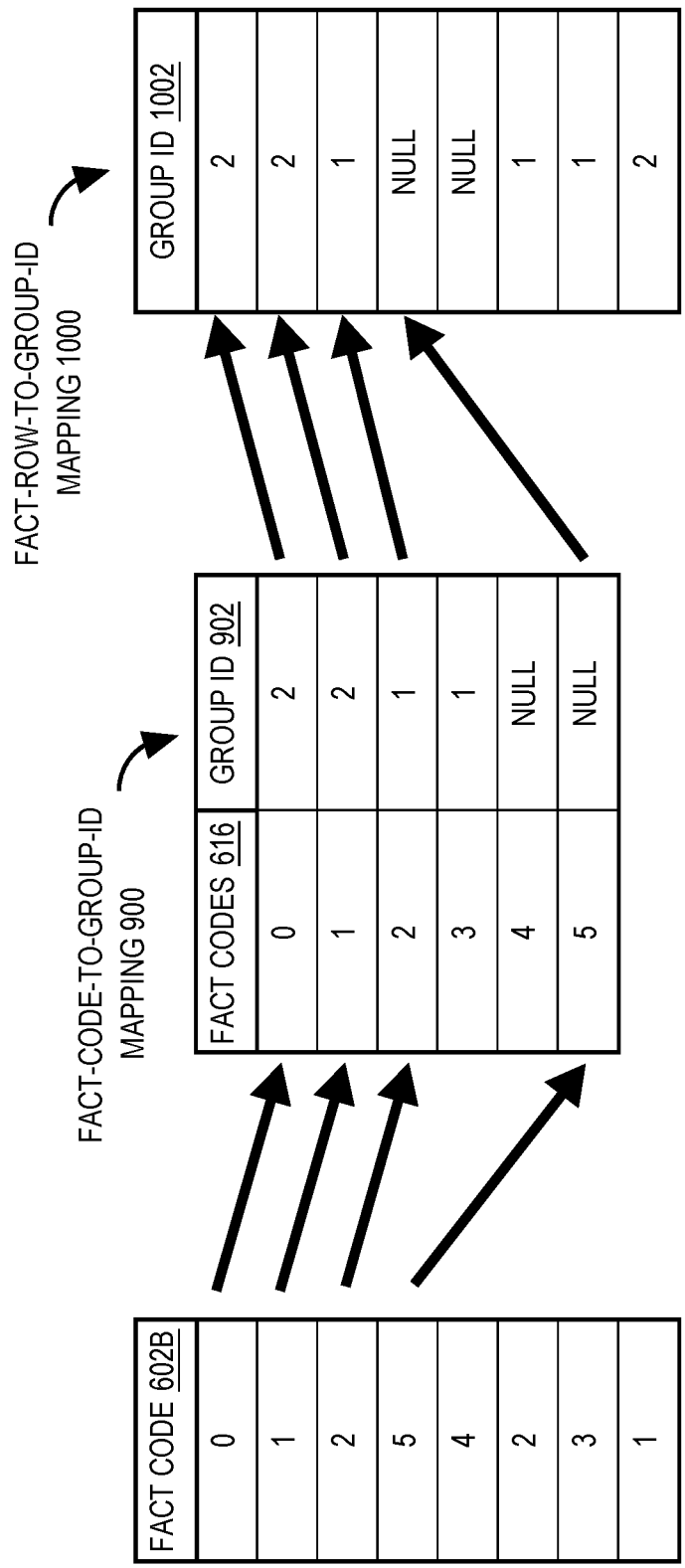
FIG. 10 depicts an example fact-row-to-group-identifier mapping.
Figure 11:
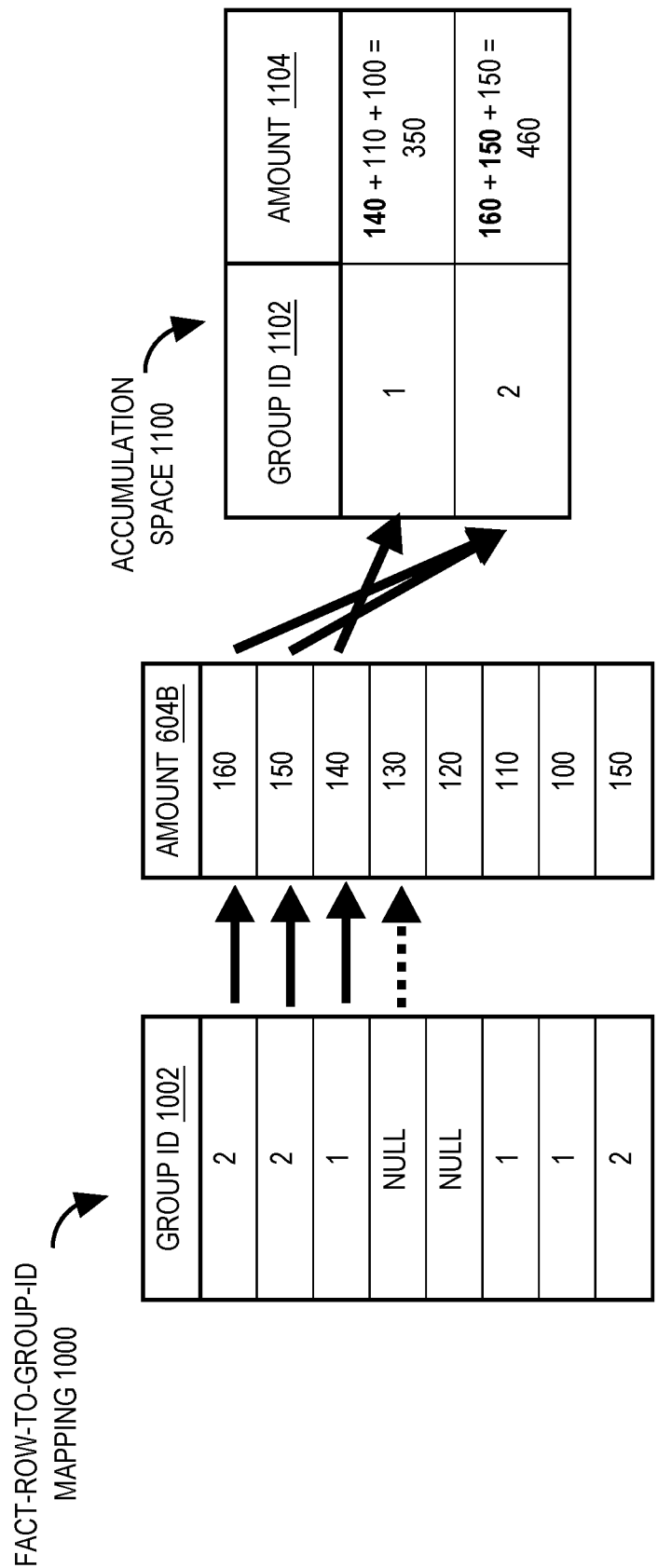
FIG. 11 depicts an example approach for performing a partial aggregation based on a fact-row-to-group-identifier mapping.

When one or more cumulative totals have been computed, a query result may be generated using a process similar to that depicted in FIG. 5. This may involve a relatively inexpensive join operation between a row-group-to-group-identifier mapping and accumulation space 1500.

Process Overview

Figure 16:
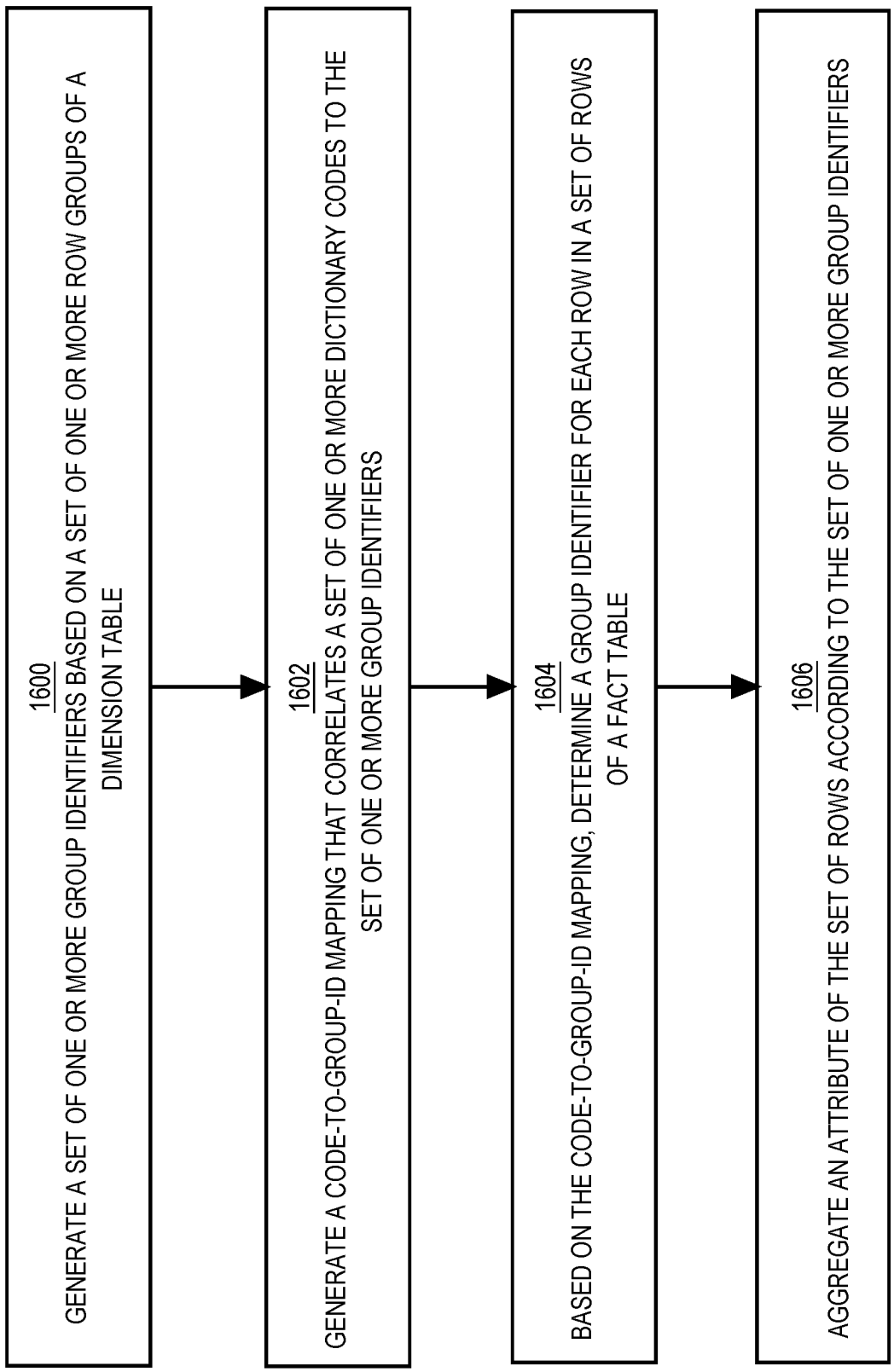
FIG. 16 is a flow diagram that depicts an example approach for performing an aggregation based on a dictionary-code-to-group-identifier mapping.

FIG. 16 depicts an example approach for performing grouped aggregations based on one or more dictionary-code-to-group-identifier mappings. When grouped aggregations involve multiple dimension tables, at least part of the process of FIG. 16 may iterate or be performed multiple times in parallel.

At block 1600, a set of one or more group identifiers is generated based on a set of one or more row groups of a dimension table. The set of one or more row groups are specified in a database query. In some embodiments, block 1600 is performed while scanning the dimension table. The set of one or more group identifiers may be used to generate a row-group-to-group-identifier mapping.

At block 1602, a dictionary-code-to-group-identifier mapping is generated. The mapping correlates a set of one or more dictionary codes to a set of one or more group identifiers. The set of one or more dictionary codes corresponds to encoded join keys stored in both a fact table and a dimension table. The set of one or more group identifiers is determined based on a set of one or more row groups that is specified by a query. More specifically, the set of one or more group identifiers is assigned to the set of one or more row groups.

In some embodiments, a data warehouse stores multiple dimension tables that each share a respective code dictionary with a fact table. Since there is a separate code dictionary for each dimension table, a separate dictionary-code-to-group-identifier mapping is generated for each dimension table.

At block 1604, a group identifier is determined for each fact table row based on the dictionary-code-to-group-identifier mapping. While scanning a column of encoded join keys in a fact table, the dictionary-code-to-group-identifier mapping may be accessed to determine a group identifier for each encoded join key. The group identifiers determined in this way can be correlated with values of a measure column.

As mentioned above, each group identifier corresponds to a row group specified by a query. Thus, this determination effectively separates fact table rows into one or more groups specified by the query.

At block 1606, a row attribute is aggregated according to the one or more groups specified by the query. Aggregation may involve accumulating values of the row attribute into a data structure that stores a respective cumulative total for each group identifier/combination of group identifiers.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 17:
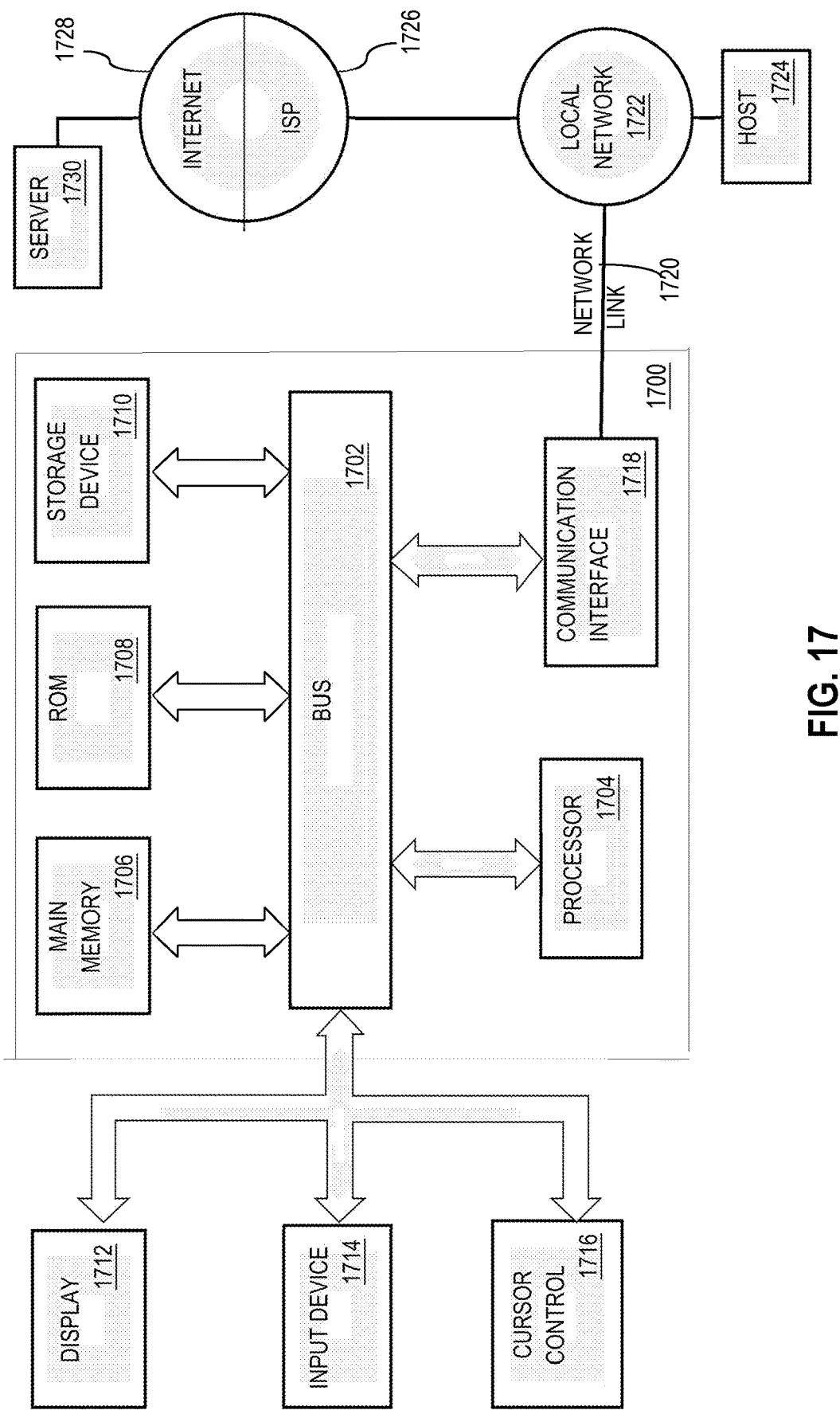
FIG. 17 depicts a computer system upon which embodiments may be implemented.

For example, FIG. 17 is a block diagram that illustrates a computer system 1700 upon which an embodiment of the disclosure may be implemented. Computer system 1700 includes a bus 1702 or other communication mechanism for communicating information, and a hardware processor 1704 coupled with bus 1702 for processing information. Hardware processor 1704 may be, for example, a general purpose microprocessor.

In some embodiments, co-processors may reside on the same chip as hardware processors or processor cores. Examples of such co-processors include a data analytics accelerator (DAX) co-processor and a single instruction, multiple data (SIMD) processor.

A DAX co-processor enables database operations to run directly in the co-processor while hardware processor cores execute other instructions. Such operations include (1) scanning an array for elements which match (or greater than or less than) an input value and returning a bit vector with bits set for matches; (2) selecting elements from an array based on a bit vector; and (3) in set operation, given an input set of integers, determining how many of them are also present in another set.

SIMD processors perform the same operation on multiple data items simultaneously. SIMD processors exploit data level parallelism by executing a single instruction against data in multiple registers or sub-registers. Thus, the throughput per instruction may be increased accordingly.

Computer system 1700 also includes a main memory 1706, such as a random access memory (RAM) or other dynamic storage device, coupled to bus 1702 for storing information and instructions to be executed by processor 1704. Main memory 1706 also may be used for storing temporary variables or other intermediate information during execution of instructions to be executed by processor 1704. Such instructions, when stored in non-transitory storage media accessible to processor 1704, render computer system 1700 into a special-purpose machine that is customized to perform the operations specified in the instructions.

Computer system 1700 further includes a read only memory (ROM) 1708 or other static storage device coupled to bus 1702 for storing static information and instructions for processor 1704. A storage device 1710, such as a magnetic disk, optical disk, or solid-state drive is provided and coupled to bus 1702 for storing information and instructions.

Computer system 1700 may be coupled via bus 1702 to a display 1712, such as a cathode ray tube (CRT), for displaying information to a computer user. An input device 1714, including alphanumeric and other keys, is coupled to bus 1702 for communicating information and command selections to processor 1704. Another type of user input device is cursor control 1716, such as a mouse, a trackball, or cursor direction keys for communicating direction information and command selections to processor 1704 and for controlling cursor movement on display 1712. This input device typically has two degrees of freedom in two axes, a first axis (e.g., x) and a second axis (e.g., y), that allows the device to specify positions in a plane.

Computer system 1700 may implement the techniques described herein using customized hard-wired logic, one or more ASICs or FPGAs, firmware and/or program logic which in combination with the computer system causes or programs computer system 1700 to be a special-purpose machine. According to one embodiment, the techniques herein are performed by computer system 1700 in response to processor 1704 executing one or more sequences of one or more instructions contained in main memory 1706. Such instructions may be read into main memory 1706 from another storage medium, such as storage device 1710. Execution of the sequences of instructions contained in main memory 1706 causes processor 1704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1710. Volatile media includes dynamic memory, such as main memory 1706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1702. Transmission media can also take the form of acoustic or light waves, such as those generated during radio-wave and infra-red data communications.

Various forms of media may be involved in carrying one or more sequences of one or more instructions to processor 1704 for execution. For example, the instructions may initially be carried on a magnetic disk or solid-state drive of a remote computer. The remote computer can load the instructions into its dynamic memory and send the instructions over a telephone line using a modem. A modem local to computer system 1700 can receive the data on the telephone line and use an infra-red transmitter to convert the data to an infra-red signal. An infra-red detector can receive the data carried in the infra-red signal and appropriate circuitry can place the data on bus 1702. Bus 1702 carries the data to main memory 1706, from which processor 1704 retrieves and executes the instructions. The instructions received by main memory 1706 may optionally be stored on storage device 1710 either before or after execution by processor 1704.

Computer system 1700 also includes a communication interface 1718 coupled to bus 1702. Communication interface 1718 provides a two-way data communication coupling to a network link 1720 that is connected to a local network 1722. For example, communication interface 1718 may be an integrated services digital network (ISDN) card, cable modem, satellite modem, or a modem to provide a data communication connection to a corresponding type of telephone line. As another example, communication interface 1718 may be a local area network (LAN) card to provide a data communication connection to a compatible LAN. Wireless links may also be implemented. In any such implementation, communication interface 1718 sends and receives electrical, electromagnetic or optical signals that carry digital data streams representing various types of information.

Network link 1720 typically provides data communication through one or more networks to other data devices. For example, network link 1720 may provide a connection through local network 1722 to a host computer 1724 or to data equipment operated by an Internet Service Provider (ISP) 1726. ISP 1726 in turn provides data communication services through the world wide packet data communication network now commonly referred to as the "Internet" 1728. Local network 1722 and Internet 1728 both use electrical, electromagnetic or optical signals that carry digital data streams. The signals through the various networks and the signals on network link 1720 and through communication interface 1718, which carry the digital data to and from computer system 1700, are example forms of transmission media.

Computer system 1700 can send messages and receive data, including program code, through the network(s), network link 1720 and communication interface 1718. In the Internet example, a server 1730 might transmit a requested code for an application program through Internet 1728, ISP 1726, local network 1722 and communication interface 1718.

The received code may be executed by processor 1704 as it is received, and/or stored in storage device 1710, or other non-volatile storage for later execution.

Software Overview

Figure 18:
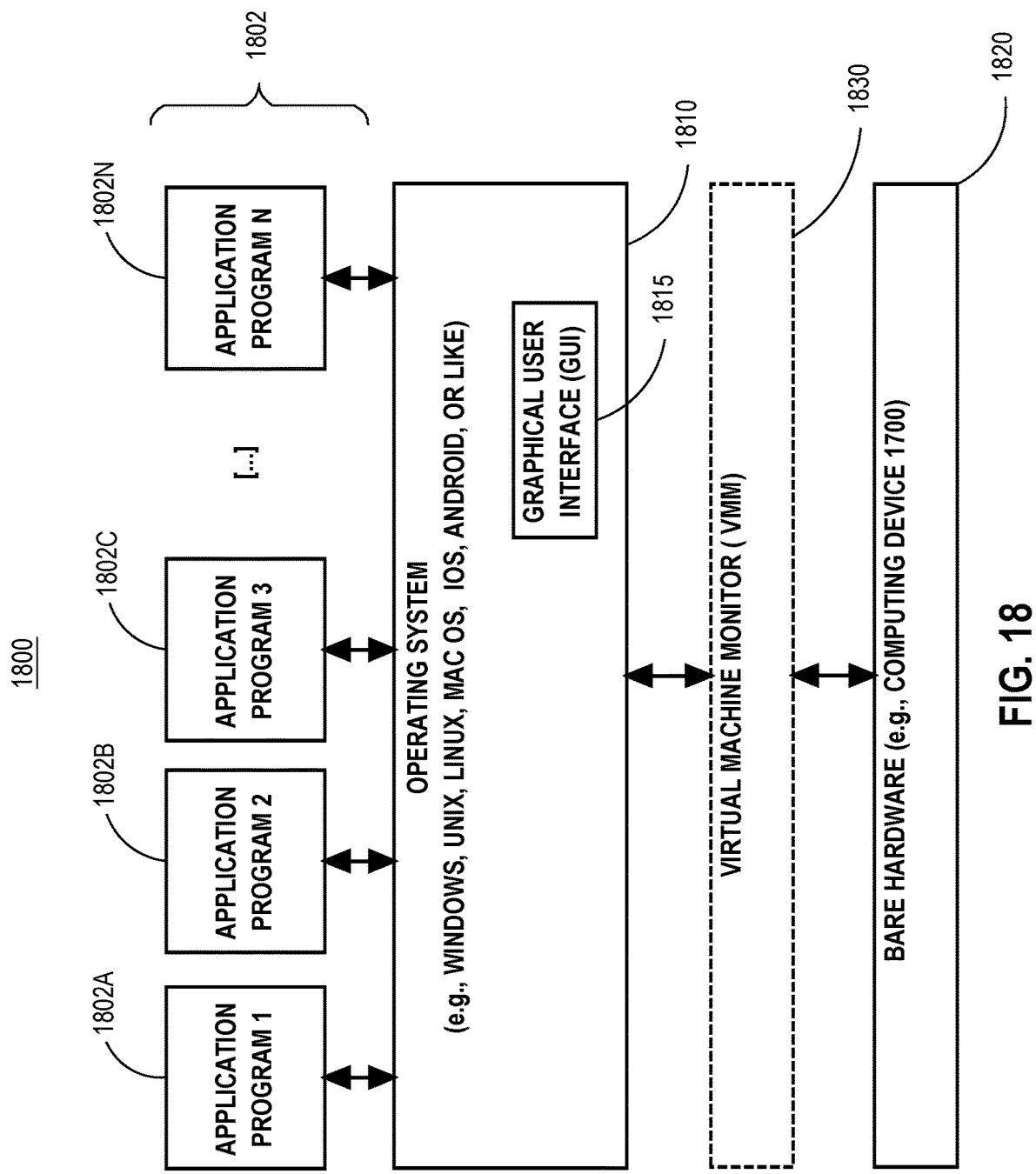
FIG. 18 depicts a software system for controlling the operation of the computer system.

FIG. 18 is a block diagram of a software system 1800 that may be employed for controlling the operation of computer system 1700. Software system 1800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1800 is provided for directing the operation of computer system 1700. Software system 1800, which may be stored in system memory (RAM) 1706 and on fixed storage (e.g., hard disk or flash memory) 1710, includes a kernel or operating system (OS) 1810.

The OS 1810 manages low-level aspects of computer operation, including managing execution of processes, memory allocation, file input and output (I/O), and device I/O. One or more application programs, represented as 1802A, 1802B, 1802C . . . 1802N, may be "loaded" (e.g., transferred from fixed storage 1710 into memory 1706) for execution by the system 1700. The applications or other software intended for use on system 1700 may also be stored as a set of downloadable computer-executable instructions, for example, for downloading and installation from an Internet location (e.g., a Web server, an app store, or other online service).

Software system 1800 includes a graphical user interface (GUI) 1815, for receiving user commands and data in a graphical (e.g., "point-and-click" or "touch gesture") fashion. These inputs, in turn, may be acted upon by the system 1800 in accordance with instructions from operating system 1810 and/or application(s) 1802. The GUI 1815 also serves to display the results of operation from the OS 1810 and application(s) 1802, whereupon the user may supply additional inputs or terminate the session (e.g., log off).

OS 1810 can execute directly on the bare hardware 1820 (e.g., processor(s) 1704) of system 1800. Alternatively, a hypervisor or virtual machine monitor (VMM) 1830 may be interposed between the bare hardware 1820 and the OS 1810. In this configuration, VMM 1830 acts as a software "cushion" or virtualization layer between the OS 1810 and the bare hardware 1820 of the system 1700.

VMM 1830 instantiates and runs one or more virtual machine instances ("guest machines"). Each guest machine comprises a "guest" operating system, such as OS 1810, and one or more applications, such as application(s) 1802, designed to execute on the guest operating system. The VMM 1830 presents the guest operating systems with a virtual operating platform and manages the execution of the guest operating systems.

In some instances, the VMM 1830 may allow a guest operating system to run as if it is running on the bare hardware 1820 of system 1700 directly. In these instances, the same version of the guest operating system configured to execute on the bare hardware 1820 directly may also execute on VMM 1830 without modification or reconfiguration. In other words, VMM 1830 may provide full hardware and CPU virtualization to a guest operating system in some instances.

In other instances, a guest operating system may be specially designed or configured to execute on VMM 1830 for efficiency. In these instances, the guest operating system is "aware" that it executes on a virtual machine monitor. In other words, VMM 1830 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
    storing a fact table and a first dimension table that share a first domain dictionary, said fact table and said first dimension table each having a column of first encoded join keys that is decodable using said first domain dictionary;
    receiving a query that specifies a first set of one or more row groups for said first dimension table;
    assigning a first set of one or more group identifiers to said first set of one or more row groups, each row group of said first set of one or more row groups being assigned to a different group identifier;
    generating a first code-to-group-identifier mapping that correlates said first encoded join keys to said first set of one or more group identifiers; and
    wherein the method is performed by one or more computing devices.

2. The method of claim 1, further comprising:
    based on said first code-to-group-identifier mapping, determining a row group of said first set of one or more row groups for each row in a set of rows of said fact table.

3. The method of claim 1, wherein said first set of one or more group identifiers comprises a set of one or more numeric values.

4. The method of claim 2, wherein said query comprises a predicate condition, and wherein any row that fails to satisfy said predicate condition is excluded from said set of rows of said fact table.

5. The method of claim 2, further comprising:
aggregating an attribute of said set of rows according to said first set of one or more row groups.

6. The method of claim 5, wherein aggregating said attribute of said set of rows according to said first set of one or more row groups comprises:
accumulating values of said attribute into a data structure that stores a cumulative total for each row group of said first set of one or more row groups.

7. The method of claim 1, wherein said first code-to-group-identifier mapping is indexed to said first domain dictionary.

8. The method of claim 1, further comprising:
storing a second dimension table that shares a second domain dictionary with said fact table, said second dimension table and said fact table each having a column of second encoded join keys that is decodable using said second domain dictionary;
assigning a second set of one or more group identifiers to a second set of one or more row groups that is specified for said second dimension table by said query; and
generating a second code-to-group-identifier mapping that correlates said second encoded join keys to said second set of one or more group identifiers.

9. The method of claim 8, further comprising:
based on said second code-to-group-identifier mapping, determining a row group of said second set of one or more row groups for each row in a set of rows of said fact table; and
aggregating an attribute of said set of rows according to said second set of one or more row groups.

10. The method of claim 9, wherein aggregating said attribute of said set of rows according to said second set of one or more row groups comprises:
accumulating values of said attribute into a data structure that stores a cumulative total for each combination of a group identifier from said first set of one or more group identifiers and a group identifier from said second set of one or more group identifiers.

11. One or more non-transitory storage media storing a sequence of instructions which, when executed by one or more computing devices, cause:
storing a fact table and a first dimension table that share a first domain dictionary, said fact table and said first dimension table each having a column of first encoded join keys that is decodable using said first domain dictionary;
receiving a query that specifies a first set of one or more row groups for said first dimension table;
assigning a first set of one or more group identifiers to said first set of one or more row groups, each row group of said first set of one or more row groups being assigned to a different group identifier; and
generating a first code-to-group-identifier mapping that correlates said first encoded join keys to said first set of one or more group identifiers.

12. The one or more non-transitory storage media of claim 11, wherein said sequence of instructions further comprise instructions which, when executed by said one or more computing devices, cause:
based on said first code-to-group-identifier mapping, determining a row group of said first set of one or more row groups for each row in a set of rows of said fact table.

13. The one or more non-transitory storage media of claim 11, wherein said first set of one or more group identifiers comprises a set of one or more numeric values.

14. The one or more non-transitory storage media of claim 12, wherein said query comprises a predicate condition, and wherein any row that fails to satisfy said predicate condition is excluded from said set of rows of said fact table.

15. The one or more non-transitory storage media of claim 12, wherein said sequence of instructions further comprise instructions which, when executed by said one or more computing devices, cause:
aggregating an attribute of said set of rows according to said first set of one or more row groups.

16. The one or more non-transitory storage media of claim 15, wherein aggregating said attribute of said set of rows according to said first set of one or more row groups comprises:
accumulating values of said attribute into a data structure that stores a cumulative total for each row group of said first set of one or more row groups.

17. The one or more non-transitory storage media of claim 11, wherein said first code-to-group-identifier mapping is indexed to said first domain dictionary.

18. The one or more non-transitory storage media of claim 11, wherein said sequence of instructions further comprise instructions which, when executed by said one or more computing devices, cause:
storing a second dimension table that shares a second domain dictionary with said fact table, said second dimension table and said fact table each having a column of second encoded join keys that is decodable using said second domain dictionary;
assigning a second set of one or more group identifiers to a second set of one or more row groups that is specified for said second dimension table by said query; and
generating a second code-to-group-identifier mapping that correlates said second encoded join keys to said second set of one or more group identifiers.

19. The one or more non-transitory storage media of claim 18, wherein said sequence of instructions further comprise instructions, which when executed by said one or more computing devices, cause:
based on said second code-to-group-identifier mapping, determining a row group of said second set of one or more row groups for each row in a set of rows of said fact table; and
aggregating an attribute of said set of rows according to said second set of one or more row groups.

20. The one or more non-transitory storage media of claim 19, wherein aggregating said attribute of said set of rows according to said second set of one or more row groups comprises:
accumulating values of said attribute into a data structure that stores a cumulative total for each combination of a group identifier from said first set of one or more group identifiers and a group identifier from said second set of one or more group identifiers.

* * * * *

UNITED STATES PATENT AND TRADEMARK OFFICE
CERTIFICATE OF CORRECTION

PATENT NO. : 10,810,198 B2
APPLICATION NO. : 15/918132
DATED : October 20, 2020
INVENTOR(S) : Hopeman, IV et al.

It is certified that error appears in the above-identified patent and that said Letters Patent is hereby corrected as shown below:

In the Drawings

On sheet 18 of 18, in FIG. 18, under Reference Numeral 1830, Line 1, delete "( VMM)" and insert -- (VMM) --, therefor.

In the Specification

Column 11, Line 35, delete "vector: P" and insert -- vector: --, therefor.

In the Claims

Column 19, Line 42, Claim 11, delete "instructions which," and insert -- instructions, which --, therefor.

Column 19, Line 60, Claim 12, delete "instructions which," and insert -- instructions, which --, therefor.

Column 20, Line 13, Claim 15, delete "instructions which," and insert -- instructions, which --, therefor.

Column 20, Line 29, Claim 18, delete "instructions which," and insert -- instructions, which --, therefor.

Signed and Sealed this
Eleventh Day of May, 2021

Drew Hirshfeld
*Performing the Functions and Duties of the
Under Secretary of Commerce for Intellectual Property and
Director of the United States Patent and Trademark Office*